(12) United States Patent
van den Berg et al.

(10) Patent No.: US 9,185,918 B2
(45) Date of Patent: *Nov. 17, 2015

(54) MEAT PROCESSING EQUIPMENT HAVING IMPROVED YIELDABLE ARRESTING MEANS

(71) Applicant: Foodmate B.V., Oud-Beijerland (NL)

(72) Inventors: Juul Floris van den Berg, Oud-Beijerland (NL); Mark Thomas Gustaaf den Boer, Oud-Beijerland (NL); Jacobus Eliza Hazenbroek, Klaaswaal (NL)

(73) Assignee: Foodmate BV (NL)

( * ) Notice: Subject to any disclaimer, the term of this patent is extended or adjusted under 35 U.S.C. 154(b) by 64 days.

This patent is subject to a terminal disclaimer.

(21) Appl. No.: 13/804,215

(22) Filed: Mar. 14, 2013

(65) Prior Publication Data

US 2013/0196584 A1 Aug. 1, 2013

Related U.S. Application Data

(63) Continuation of application No. PCT/NL2011/050716, filed on Oct. 18, 2011.

(30) Foreign Application Priority Data

Jan. 26, 2011 (NL) ..................................... 2006075

(51) Int. Cl.
*A22C 21/00* (2006.01)
*B65G 17/46* (2006.01)
*A22B 7/00* (2006.01)

(52) U.S. Cl.
CPC ............. *A22C 21/0046* (2013.01); *A22B 7/002* (2013.01); *A22B 7/006* (2013.01); *A22C 21/0007* (2013.01); *A22C 21/0053* (2013.01); *B65G 17/46* (2013.01)

(58) Field of Classification Search
CPC ........ A22B 7/002; A22B 7/003; A22B 7/006; A22C 21/0007; B65G 17/46
USPC .................. 452/185, 187–189; 198/679–682
See application file for complete search history.

(56) References Cited

U.S. PATENT DOCUMENTS

| 2,526,253 | A | * | 10/1950 | Merrill | .......................... 198/679 |
|---|---|---|---|---|---|
| 3,651,541 | A | | 3/1972 | Jaccard | |
| 3,956,794 | A | | 5/1976 | Verbakel | |
| 3,969,790 | A | | 7/1976 | Smorenburg | |

(Continued)

FOREIGN PATENT DOCUMENTS

| EP | 0 736 255 A1 | 10/1996 |
|---|---|---|
| EP | 0 786 208 A1 | 7/1997 |

(Continued)

OTHER PUBLICATIONS

Search Report in Netherlands Application No. 2006075 dated Jan. 12, 2011.
Office Action in EP Application No. 12 703 612.7 dated May 26, 2014.

*Primary Examiner* — David Parsley
(74) *Attorney, Agent, or Firm* — Womble Carlyle Sandridge & Rice LLP

(57) ABSTRACT

Meat processing equipment is disclosed that includes a first element having a first face; a second element having a second face. The first and second faces extend parallel to one another and define a common plane between the first and second faces. The first and second elements are relatively movable with respect to one another. Yieldable arresting features are included for yieldably arresting the first and second elements in at least one predetermined position of relative movement, the yieldable arresting features include cooperating first and second permanent magnets associated with at least one of the first and second elements.

17 Claims, 8 Drawing Sheets

(56) References Cited

U.S. PATENT DOCUMENTS

| | | |
|---|---|---|
| 3,979,793 A | 9/1976 | Hazenbroek |
| 3,983,601 A | 10/1976 | Verbakel |
| 3,990,128 A | 11/1976 | van Mil |
| 4,011,573 A | 3/1977 | Braico |
| 4,034,440 A | 7/1977 | van Mil |
| 4,096,950 A | 6/1978 | Brook |
| 4,118,829 A | 10/1978 | Harben, Jr. |
| 4,131,973 A | 1/1979 | Verbakel |
| 4,147,012 A | 4/1979 | van Mil |
| 4,153,971 A | 5/1979 | Simonds |
| 4,153,972 A | 5/1979 | Harben et al. |
| 4,178,659 A | 12/1979 | Simonds |
| 4,203,178 A | 5/1980 | Hazenbroek |
| 4,283,813 A | 8/1981 | House |
| 4,292,709 A | 10/1981 | van Mil |
| 4,388,811 A | 6/1983 | Zebarth |
| 4,395,795 A | 8/1983 | Hazenbroek |
| 4,406,037 A | 9/1983 | Hazenbroek |
| 4,418,444 A | 12/1983 | Meyn et al. |
| 4,418,445 A | 12/1983 | Meyn et al. |
| 4,434,526 A | 3/1984 | van Mil |
| 4,437,207 A * | 3/1984 | Ross ............... 452/141 |
| 4,439,891 A | 4/1984 | van Mil |
| 4,468,838 A | 9/1984 | Sjöström et al. |
| 4,510,886 A | 4/1985 | van Mil |
| 4,514,879 A | 5/1985 | Hazenbroek |
| 4,516,290 A | 5/1985 | van Mil |
| 4,524,489 A | 6/1985 | van Mil |
| 4,558,490 A | 12/1985 | Hazenbroek et al. |
| 4,559,672 A | 12/1985 | Hazenbroek et al. |
| 4,567,624 A | 2/1986 | van Mil |
| 4,570,295 A | 2/1986 | van Mil |
| 4,574,429 A | 3/1986 | Hazenbroek |
| 4,577,368 A | 3/1986 | Hazenbroek |
| D283,289 S | 4/1986 | Hazenbroek |
| 4,593,432 A | 6/1986 | Hazenbroek |
| 4,597,133 A | 7/1986 | van den Nieuwelaar |
| 4,597,136 A | 7/1986 | Hazenbroek |
| 4,635,317 A | 1/1987 | van der Eerden |
| 4,639,973 A | 2/1987 | van der Eerden |
| 4,639,974 A | 2/1987 | Olson |
| 4,639,975 A | 2/1987 | van der Eerden |
| 4,646,384 A | 3/1987 | van der Eerden |
| 4,651,383 A | 3/1987 | van der Eerden |
| 4,653,147 A | 3/1987 | van der Eerden |
| 4,682,386 A | 7/1987 | Hazenbroek et al. |
| 4,704,768 A | 11/1987 | Hutting et al. |
| 4,723,339 A | 2/1988 | van den Nieuwelaar et al. |
| 4,724,581 A | 2/1988 | van den Nieuwelaar |
| 4,736,492 A | 4/1988 | Hazenbroek et al. |
| RE32,697 E | 6/1988 | Hazenbroek et al. |
| 4,765,028 A | 8/1988 | van den Nieuwelaar et al. |
| 4,766,644 A | 8/1988 | van den Nieuwelaar et al. |
| 4,769,872 A | 9/1988 | Hazenbroek et al. |
| 4,779,308 A | 10/1988 | van den Nieuwelaar et al. |
| 4,788,749 A | 12/1988 | Hazenbroek et al. |
| 4,811,456 A | 3/1989 | Heuvel |
| 4,811,458 A | 3/1989 | Nieuwelaar et al. |
| 4,811,462 A | 3/1989 | Meyn |
| 4,813,101 A | 3/1989 | Brakels et al. |
| 4,884,318 A | 12/1989 | Hazenbroek |
| 4,893,378 A | 1/1990 | Hazenbroek et al. |
| 4,894,885 A | 1/1990 | Markert |
| 4,896,399 A | 1/1990 | Hazenbroek |
| 4,899,421 A | 2/1990 | Van Der Eerden |
| 4,918,787 A | 4/1990 | Hazenbroek |
| 4,928,351 A | 5/1990 | van den Nieuwelaar et al. |
| 4,935,990 A | 6/1990 | Linnenbank |
| 4,939,813 A | 7/1990 | Hazenbroek |
| 4,958,694 A | 9/1990 | van den Nieuwelaar et al. |
| 4,965,908 A | 10/1990 | Meyn |
| 4,972,549 A | 11/1990 | van den Nieuwelaar et al. |
| 4,993,113 A | 2/1991 | Hazenbroek |
| 4,993,115 A | 2/1991 | Hazenbroek |
| 5,001,812 A | 3/1991 | Hazenbroek |
| 5,013,431 A | 5/1991 | Doets |
| 5,015,213 A | 5/1991 | Hazenbroek |
| 5,019,013 A | 5/1991 | Hazenbroek |
| 5,026,983 A | 6/1991 | Meyn |
| 5,035,673 A | 7/1991 | Hazenbroek |
| 5,037,351 A | 8/1991 | van den Nieuwelaar et al. |
| 5,041,054 A | 8/1991 | van den Nieuwelaar et al. |
| 5,045,022 A | 9/1991 | Hazenbroek |
| 5,060,596 A | 10/1991 | Esbroeck |
| 5,064,402 A | 11/1991 | Koops |
| 5,067,927 A | 11/1991 | Hazenbroek et al. |
| 5,069,652 A | 12/1991 | Hazenbroek |
| 5,074,823 A | 12/1991 | Meyn |
| 5,088,959 A | 2/1992 | Heemskerk |
| 5,090,940 A | 2/1992 | Adkison |
| 5,092,815 A * | 3/1992 | Polkinghorne ............... 452/179 |
| 5,098,333 A | 3/1992 | Cobb |
| 5,104,351 A | 4/1992 | van den Nieuwelaar et al. |
| 5,122,090 A | 6/1992 | van den Nieuwelaar et al. |
| 5,123,871 A | 6/1992 | van den Nieuwelaar et al. |
| 5,125,498 A | 6/1992 | Meyn |
| 5,147,240 A | 9/1992 | Hazenbroek et al. |
| 5,147,241 A | 9/1992 | Rudin |
| 5,154,664 A | 10/1992 | Hazenbroek et al. |
| 5,154,665 A | 10/1992 | Hazenbroek |
| RE34,149 E | 12/1992 | Markert |
| 5,173,076 A | 12/1992 | Hazenbroek |
| 5,173,077 A | 12/1992 | van den Nieuwelaar et al. |
| 5,176,563 A | 1/1993 | van den Nieuwelaar et al. |
| 5,176,564 A | 1/1993 | Hazenbroek |
| 5,178,890 A | 1/1993 | van den Nieuwelaar et al. |
| 5,186,679 A | 2/1993 | Meyn |
| 5,188,559 A | 2/1993 | Hazenbroek |
| 5,188,560 A | 2/1993 | Hazenbroek |
| 5,194,035 A | 3/1993 | Dillard |
| 5,197,917 A | 3/1993 | Verbakel et al. |
| 5,199,922 A | 4/1993 | Korenberg et al. |
| 5,222,905 A | 6/1993 | Van den Nieuwelaar et al. |
| 5,242,324 A | 9/1993 | Koops |
| 5,248,277 A | 9/1993 | Bos et al. |
| 5,256,101 A | 10/1993 | Koops |
| 5,269,721 A | 12/1993 | Meyn |
| 5,277,649 A | 1/1994 | Adkison |
| 5,277,650 A | 1/1994 | Meyn |
| 5,279,517 A | 1/1994 | Koops |
| 5,290,187 A | 3/1994 | Meyn |
| 5,299,975 A | 4/1994 | Meyn |
| 5,299,976 A | 4/1994 | Meyn |
| 5,318,428 A | 6/1994 | Meyn |
| 5,326,311 A | 7/1994 | Persoon et al. |
| 5,334,083 A | 8/1994 | van den Nieuwelaar et al. |
| 5,336,127 A | 8/1994 | Hazenbroek |
| 5,340,351 A | 8/1994 | Minderman et al. |
| 5,340,355 A | 8/1994 | Meyn |
| 5,342,237 A | 8/1994 | Kolkman |
| 5,344,359 A | 9/1994 | Kolkman |
| 5,344,360 A | 9/1994 | Hazenbroek |
| 5,366,406 A | 11/1994 | Hobbel et al. |
| 5,370,574 A | 12/1994 | Meyn |
| 5,372,246 A | 12/1994 | van Aalst |
| RE34,882 E | 3/1995 | Meyn |
| 5,429,549 A | 7/1995 | Verrijp et al. |
| 5,439,702 A | 8/1995 | French |
| 5,453,045 A | 9/1995 | Hobbel et al. |
| 5,462,477 A | 10/1995 | Ketels |
| 5,470,194 A | 11/1995 | Zegers |
| 5,487,700 A | 1/1996 | Dillard |
| 5,490,451 A | 2/1996 | Nersesian |
| 5,505,657 A | 4/1996 | Janssen et al. |
| 5,549,521 A | 8/1996 | van den Nieuwelaar et al. |
| D373,883 S | 9/1996 | Dillard |
| 5,569,067 A | 10/1996 | Meyn |
| 5,595,066 A | 1/1997 | Zwanikken et al. |
| 5,605,503 A | 2/1997 | Martin |
| 5,643,072 A | 7/1997 | Lankhaar et al. |
| 5,643,074 A | 7/1997 | Linnenbank |
| 5,672,098 A | 9/1997 | Veraart |
| 5,676,594 A | 10/1997 | Joosten |
| 5,704,830 A | 1/1998 | Van Ochten |

(56) References Cited

U.S. PATENT DOCUMENTS

| | | |
|---|---|---|
| 5,713,786 A | 2/1998 | Kikstra |
| 5,713,787 A | 2/1998 | Schoenmakers et al. |
| 5,741,176 A | 4/1998 | Lapp et al. |
| 5,755,617 A | 5/1998 | van Harskamp et al. |
| 5,759,095 A | 6/1998 | De Weerd |
| 5,766,063 A | 6/1998 | Hazenbroek et al. |
| 5,782,685 A | 7/1998 | Hazenbroek et al. |
| 5,785,588 A | 7/1998 | Jacobs et al. |
| 5,803,802 A | 9/1998 | Jansen |
| 5,810,651 A | 9/1998 | De Heer et al. |
| 5,810,653 A | 9/1998 | Van Craaikamp et al. |
| 5,813,908 A | 9/1998 | Craaikamp |
| 5,827,116 A | 10/1998 | Al et al. |
| 5,833,527 A | 11/1998 | Hazenbroek et al. |
| 5,865,672 A | 2/1999 | Hazenbroek |
| 5,875,738 A | 3/1999 | Hazenbroek et al. |
| 5,947,811 A | 9/1999 | Hazenbroek et al. |
| 5,951,393 A | 9/1999 | Barendregt |
| 5,975,029 A | 11/1999 | Morimoto et al. |
| 5,976,004 A | 11/1999 | Hazenbroek |
| 5,980,377 A | 11/1999 | Zwanikken et al. |
| 6,007,416 A | 12/1999 | Janssen et al. |
| 6,007,417 A | 12/1999 | Jones et al. |
| 6,024,636 A | 2/2000 | Hazenbroek et al. |
| 6,027,403 A | 2/2000 | Hazenbroek et al. |
| 6,027,404 A | 2/2000 | Wols |
| 6,029,795 A | 2/2000 | Janssen et al. |
| 6,033,299 A | 3/2000 | Stone et al. |
| 6,062,972 A | 5/2000 | Visser |
| 6,095,914 A | 8/2000 | Cornelissen et al. |
| 6,126,534 A | 10/2000 | Jacobs et al. |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt |
| 6,358,136 B1 | 3/2002 | Volk et al. |
| 6,371,843 B1 | 4/2002 | Volk et al. |
| 6,375,560 B1 | 4/2002 | Verrijp |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,530,466 B2 | 3/2003 | Murata et al. |
| 6,599,179 B1 | 7/2003 | Hazenbroek et al. |
| 6,612,919 B2 | 9/2003 | Jansen et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 | 7/2004 | Hazenbroek et al. |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 | 1/2005 | Hetterscheid et al. |
| 6,899,613 B2 | 5/2005 | van den Nieuwelaar et al. |
| 6,912,434 B2 | 6/2005 | van den Nieuwelaar et al. |
| 6,962,249 B2 * | 11/2005 | Ludwig et al. ............ 198/345.3 |
| 6,986,707 B2 | 1/2006 | van den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,232,365 B2 | 6/2007 | Annema et al. |
| 7,232,366 B2 | 6/2007 | van den Nieuwelaar et al. |
| 7,249,998 B2 | 7/2007 | van Esbroeck et al. |
| 7,261,629 B2 | 8/2007 | Holleman |
| 7,284,973 B2 | 10/2007 | van Esbroeck et al. |
| 7,302,885 B2 | 12/2007 | Townsend |
| 7,344,437 B2 | 3/2008 | Van den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,494,406 B2 | 2/2009 | Van Esbroeck et al. |
| 7,530,888 B2 | 5/2009 | Annema et al. |
| 7,572,176 B2 | 8/2009 | Petersen et al. |
| 7,662,033 B1 | 2/2010 | Ritter et al. |
| 7,662,034 B2 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 8,267,241 B2 * | 9/2012 | den Boer et al. ............. 198/679 |
| 8,360,232 B2 * | 1/2013 | Hazenbroek .................. 198/682 |
| 8,678,176 B2 * | 3/2014 | Hazenbroek .................. 198/680 |
| 8,757,354 B2 * | 6/2014 | Hazenbroek .................. 198/375 |
| 8,789,684 B2 * | 7/2014 | Hazenbroek .................. 198/679 |
| 2001/0023171 A1 | 9/2001 | Hazenbroek et al. |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |
| 2009/0320761 A1 | 12/2009 | Grave et al. |
| 2010/0022176 A1 | 1/2010 | Van De Nieuwelaar et al. |
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn |

FOREIGN PATENT DOCUMENTS

| | | |
|---|---|---|
| EP | 1 353 155 A1 | 10/2003 |
| EP | 1 440 618 | 7/2004 |
| EP | 1 538 113 A1 | 6/2005 |
| EP | 2 181 841 A1 | 5/2010 |
| FR | 2 529 177 A1 | 12/1983 |
| GB | 1 395 722 A | 5/1975 |
| WO | WO 02/44670 A1 | 6/2002 |
| WO | PCT/NL2011/050267 | 7/2013 |

* cited by examiner

MEAT PROCESSING EQUIPMENT HAVING IMPROVED YIELDABLE ARRESTING MEANS

CROSS-REFERENCE TO RELATED APPLICATIONS

This is a continuation of PCT/NL2011/050716, filed Oct. 18, 2011, which claims the benefit of Netherlands Application No. NL2006075, filed Jan. 26, 2011, each of which is hereby incorporated by reference herein in its entirety.

TECHNICAL FIELD

The invention relates generally to meat processing equipment, in particular automated meat processing equipment having improved yieldable arresting means.

BACKGROUND

Yieldable arresting or indexing arrangements are fairly common in automated meat processing equipment. One well known application is in rotatable carcass hangers for poultry processing conveyors and examples are described in EP 0444782, EP 0786208, and U.S. Pat. No. 5,092,815. All of these known arresting means rely on ball detents that are biased into recesses by the force of a helical spring. The necessary springs and cavities to house these present a serious hazard of bacterial contamination, which is objectionable in the meat processing industry. Although regular cleaning of the equipment is aimed at minimizing the hazard of bacterial infection, the risk itself could not effectively be eliminated with the known yieldable arresting means. Apart from rotatable carcass hangers, yieldable arresting means can also find application in various other parts of meat processing equipment, including bone holders.

Accordingly it is an aspect of the present invention to propose an improved yieldable arresting means for arresting relatively movable elements of meat processing equipment in at least one predetermined position of relative movement. In a more general sense it is an aspect of the present invention to at least overcome or ameliorate one or more of the disadvantages of the prior art. It is also an aspect of the present invention to at least provide alternative structures which are less cumbersome in manufacture and use and which can be made and used relatively inexpensively. At any rate the present invention is at the very least aimed at offering a useful choice and contribution to the existing art.

SUMMARY

The present invention provides a meat processing equipment including: a first element having a first face; a second element having a second face; wherein the first and second faces extend parallel to one another and define a common plane between the first and second faces; the first and second elements being relatively movable with respect to one another; and yieldable arresting means for yieldably arresting the first and second element in at least one predetermined position of relative movement, wherein the yieldable arresting means include cooperating first and second permanent magnets, associated with at least one of the first and second elements. This arrangement eliminates the need for helical springs and open cavities and thus ensures more hygienic conditions than were possible with the prior art.

Advantageously in a meat processing equipment according to the invention the first and second magnets can be either attracting or repelling one another. Both these options can be used in conjunction with and without mechanical contact between the first and second elements. Contact between the movable first and second elements through the yieldable indexing means may in some situations be useful to retard and better control the velocity rate of the relative movement between the first and second elements.

The meat processing equipment according to the invention can also have the first element include a cavity for accommodating the first magnet and/or the second element may include a cavity for accommodating the second magnet. Such cavities are easily formed into first and second elements of non-magnetic material and also can be easily sealed against the ingress of contaminations, in particular bacterial contaminations. In combination with attracting magnets the yieldable arresting means can also function entirely contactless, which is a further advantage in maintaining hygienic conditions.

It is further advantageous when in meat processing equipment according to the invention the second element includes a further cavity that accommodates a third permanent magnet forming a pair with the second magnet. In particular this is the case when the first and second magnets are not attracting one another, when the first element does not include a cavity for accommodating the first magnet, or when the second element does not include a cavity for accommodating the second magnet. When arresting one repulsive magnet in the first element between a pair of repulsive magnets in the second element, a firmer indexing may be obtained that can still function in a contactless manner.

The meat processing equipment according to the invention can also have one of the first and second magnets being part of a plunger that is arranged for translating movement in a direction perpendicular to the common plane and slideably held in a mating cavity in one of the first and second elements, and wherein the other of the first and second elements in the respective first or second face is provided with a recess engageable by the plunger. In particular this is the case when one of the following applies: the first and second magnets are not attracting one another, the first element does not include a cavity for accommodating the first magnet, or the second element does not include a cavity for accommodating the second magnet. In such an embodiment both the first and second magnets may optionally also be associated with the second element, on one side of the common plane. Depending on whether attractive or repulsive magnetic forces are use to bias the plunger into engagement with the recess, the extent of frictional engagement may be adapted to requirements. With magnetic attraction friction between the plunger and the first element is operative only in the vicinity of the recess of the first element. With magnetic repulsive forces the plunger is continuously urged toward the first element. This action is comparable to a helical spring as used in the prior art, but without the intricate surface portions of a helical spring that may result in an additional contamination hazard.

The meat processing equipment according to the invention may also have the yieldable arresting means advantageously incorporated in a support assembly for parts of slaughtered animals. In particular this is the case when the first and second magnets are not attracting one another, when the first element does not include a cavity for accommodating the first magnet, or when the second element does not include a cavity for accommodating the second magnet. Advantageously the support assembly can be a hanger for a poultry carcass. In such meat processing equipment the hanger for poultry is arranged for attachment to a conveyor extending along a processing path, the poultry hanger further may advantageously comprise: a trolley securable to the conveyor; a shackle rotatably secured with respect to the trolley and be configured to support an article; and wherein the yieldable arresting means is embodied as an indexing arrangement associated with the shackle and configured to maintain the shackle yieldably in at least a first and a second indexed rotational orientation relative to the processing path; the indexing arrangement comprising confronting surfaces rotatable with respect to each other and having surface features that mate when the shackle is in the first and the second indexed rotational orientations; and magnets associated with the indexing arrangement, the magnets being positioned and oriented to urge the confronting surfaces toward one another through magnetic force when the shackle is in the first and the second indexed rotational orientations. Optionally such meat processing equipment may further optionally comprising a turning block associated with the shackle, wherein rotation of the turning block relative to the trolley causes corresponding rotation of the shackle relative to the trolley. In this regard it is optionally advantageous when the indexing arrangement is disposed between the turning block and the trolley.

The meat processing equipment of the invention may alternatively or additionally have the yieldable arresting means incorporated in a support assembly for parts of slaughtered animals, being a bone holder. Accordingly the bone holder may then also be rotatably suspended from an overhead conveyor. Advantageously the bone holder may alternatively or additionally include a receiving block and a locking arm that is swivelable with respect to the receiving block between an open and a closed position and is embodied as one of the first and second elements and wherein the receiving block is then embodied as the other of the first and second elements. In such meat processing equipment the swivelable locking arm can be magnetically latched in its closed position and/or the swivelable locking arm can be magnetically arrested in its open position.

The latter mentioned specific exemplary applications of arresting means should not be regarded as limiting the invention in any way. These are merely examples of practical embodiments, but various others will be apparent to the skilled person without diverting from the invention as defined in the appended claims.

Further advantageous aspects of the invention will become clear from the appended description and in reference to the accompanying drawings, which are briefly described as follows:

DETAILED DESCRIPTION

Figure 1:
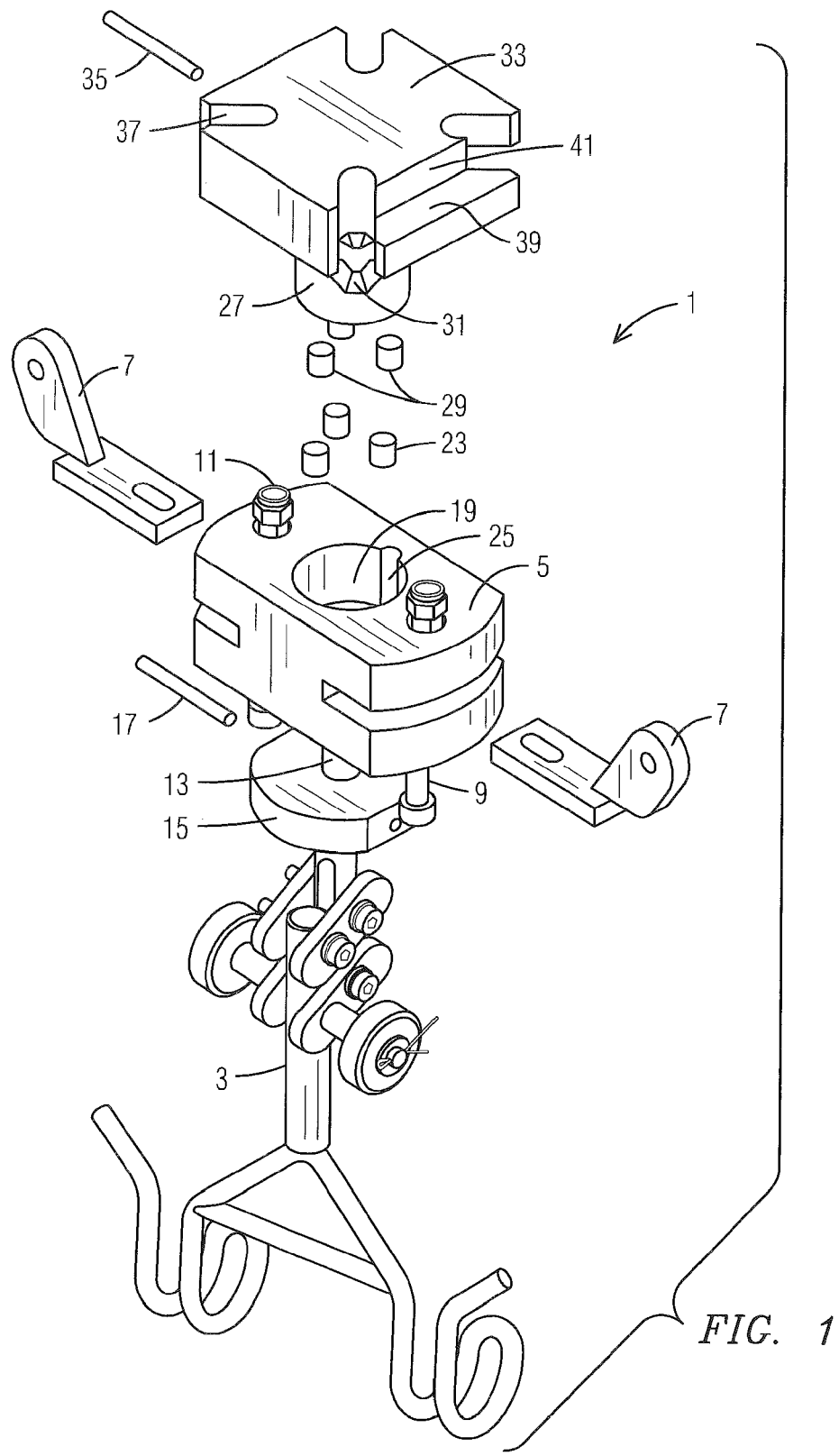
FIG. 1 is an exploded perspective illustration of a rotatable article support.
Figure 2:
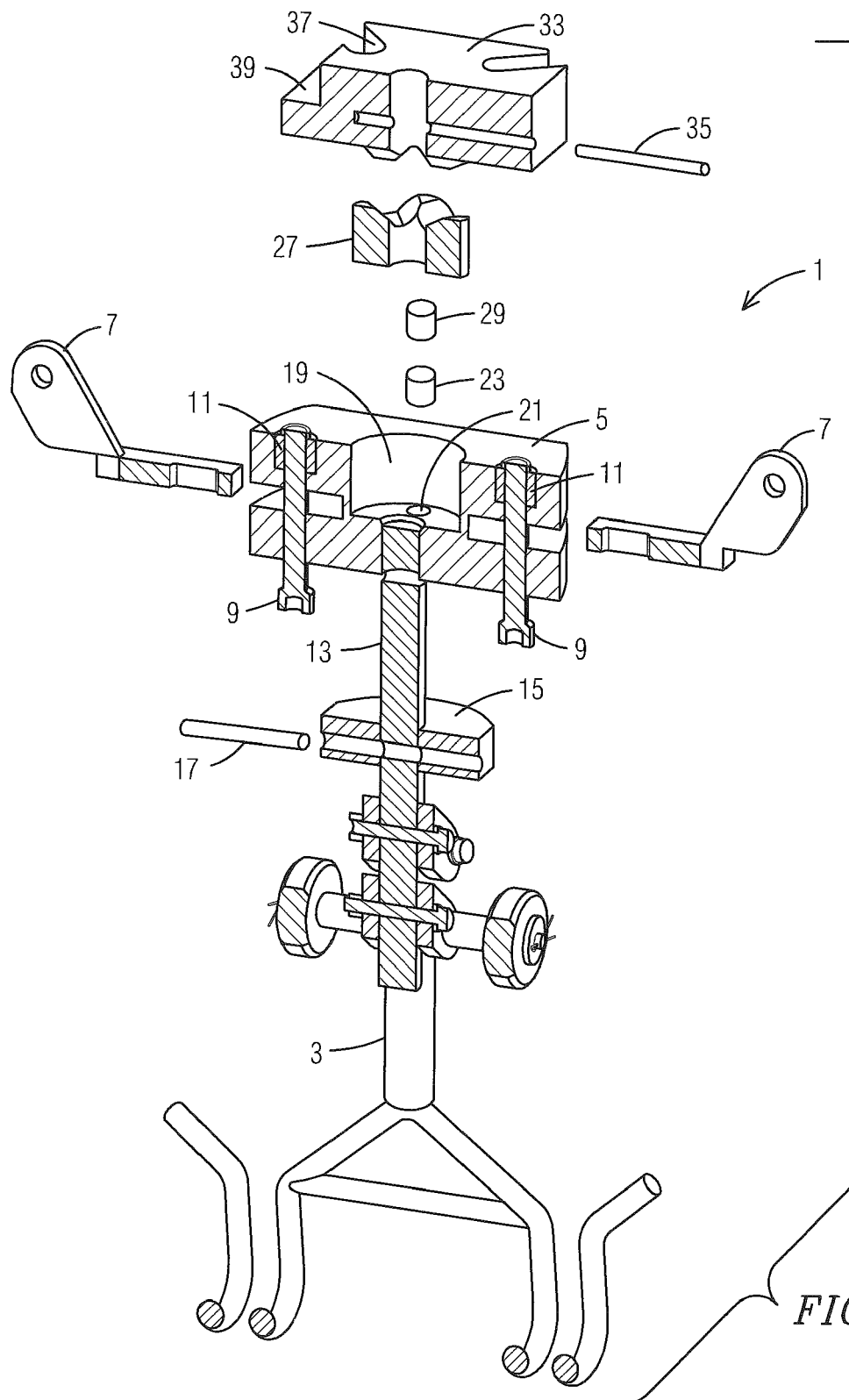
FIG. 2 is a cross section of the exploded perspective illustration of FIG. 1.

In FIG. 1 an exploded arrangement is shown of a rotatable article support assembly 1. The article support assembly 1 is provided with a shackle 3, which in this example is a so called weighing shackle for the suspension of animal carcasses, such as fowl or poultry carcasses. The shackle 3 is rotatably suspended from a base block 5. The base block 5 is arranged for movement along an overhead conveyor rail or track (not shown, but conventional). Such conveyor rails or tracks are common in industrial apparatuses for carrying out a succession of processing steps. Commonly such conveying tracks are laid out in a continuous loop that defines a path of conveyance along a plurality of processing stations. Such systems are well known in the meat processing industry, but are also used in other disciplines of industry and manufacture. In this regard the base block 5 forms a trolley or carriage that is linked to similar base blocks of adjacent article support assemblies by trolley brackets 7 and chains, or the like. The trolley brackets 7 are attached to the base block 5 by means of bolts 9 and nuts 11. Extending upwardly from shackle 3 is a shaft 13 to which an abutment flange 15 is attached by means of a first transverse pin 17. The shaft 13 extends upwardly through a central bore in the base block 5, which central is enlarged at the upper end of the base block 5 to form a cavity 19. The cavity 19, as best seen in FIG. 2, has three bores 21 (only one visible in FIG. 2) for each receiving a lower magnet 23. The cavity 19 has a groove 25 for non-rotatably receiving an indexing plunger 27 which has it perimeter adapted to the contour of cavity 19 to inhibit relative rotation but to allow axial movement of the plunger 27.

Figures 3, 4:
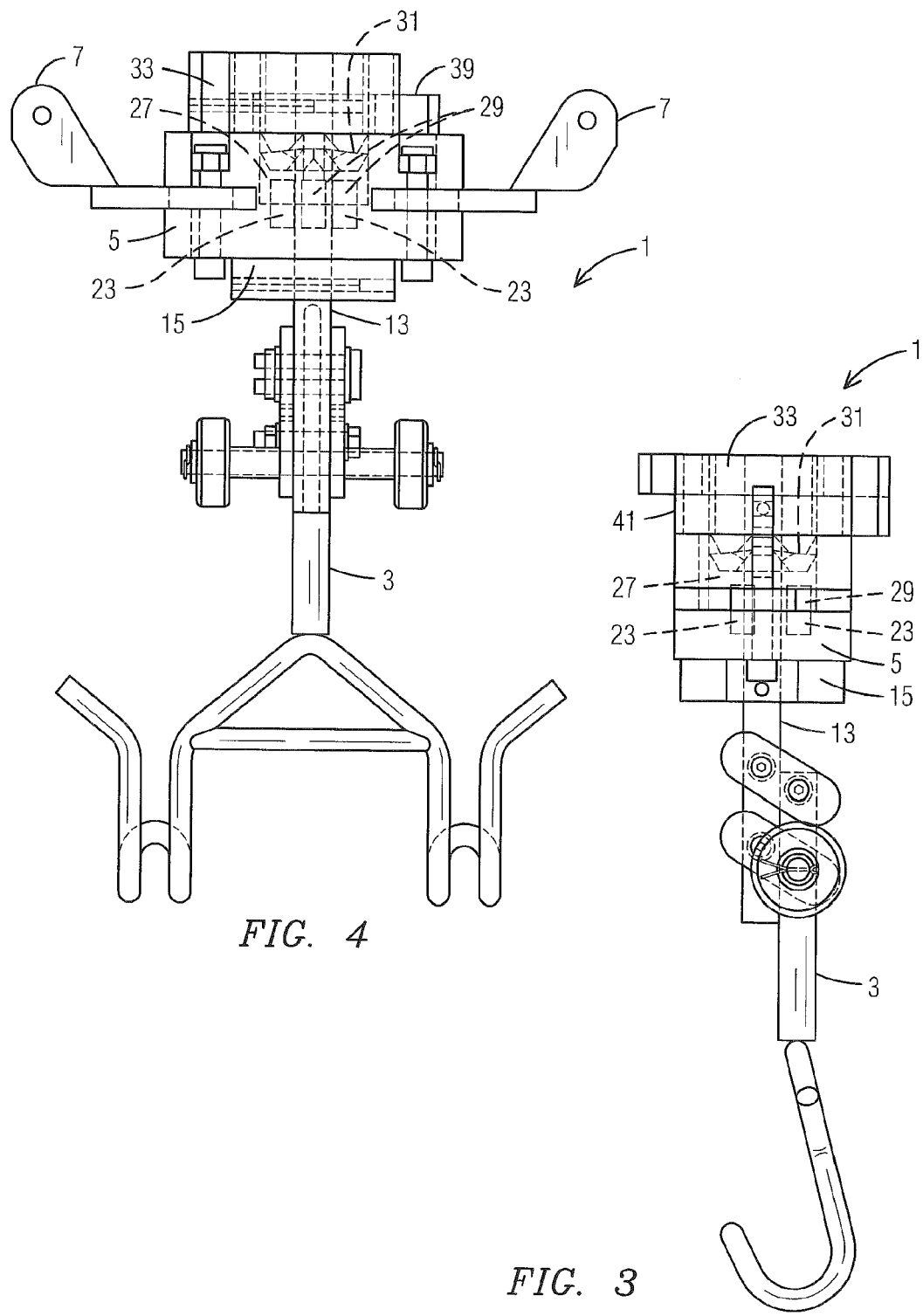
FIG. 3 is a side elevation in ghost view of the article support of FIGS. 1 and 2.
FIG. 4 is a rear elevation in ghost view of the article support of FIGS. 1, 2 and 3.

Not visible in FIGS. 1 and 2, but visible in the ghost views of FIGS. 3 and 4, the indexing plunger 27 has bores opening into its bottom surface for receiving upper magnets 29. In this example the lower magnets 23 are positioned with their north poles on top and the upper magnets 29 are positioned with their north poles facing down. In such an orientation, the lower and upper magnets 23, 29 will repulse one another, so that the indexing plunger 27 carries a number of radial indexing formations 31, which cooperate with complementary indexing formation on a lower face of a turning gear, or turning block 33. In this example, the indexing formations 31 provide rotational positions that are 90° apart. The turning block 33 is mounted to the shaft 13 by means of a second transverse pin 35. Spacing between transverse bore in the shaft 13 for receiving the first and second transverse pins 17, 35 is such that the base block 5 is snugly and rotatably received between the abutment flange 15 and the turning block 33. Thereby also the indexing plunger 27 is held within the cavity 19 of the base block 5 against the repulsive forces of the confronting lower and upper magnets 23, 29. The magnets 23, 29 are preferably identical and sintered rare earth magnets. Such sintered rare earth magnets may contain neodymium or be ceramic magnets of ferrous material.

Another suitable magnet material may be samarium cobalt. The polarity of the lower and upper magnets 23, 29 should be properly directed to obtain the repulsive force necessary to bias the indexing formation 31 in engagement with the turning block 33. This can be with the north poles of confronting magnets facing one another, but may also be achieved by having the south poles facing one another. The important aspect is that equal poles of confronting magnets are facing one another. The turning block 33 further has diagonal slots 37 extending diagonally inwardly from each corner of the substantially square contour of the turning block 33.

In FIGS. 3 and 4 a side and a rear elevation of the assembled article support assembly 1 are illustrated as ghost views. Thereby internal parts like the magnets 23, 29, the indexing plunger 27 and the indexing formations 31 are visible as if the base block 5 and the turning block 33 were of transparent material. Also best visible in FIGS. 3 and 4 is that the turning block 33 has an upper cut-out 39 along one edge extending between adjacent slots 37, as well as a lower cut-out 41 along another edge that is perpendicular to the one edge.

Figure 5:
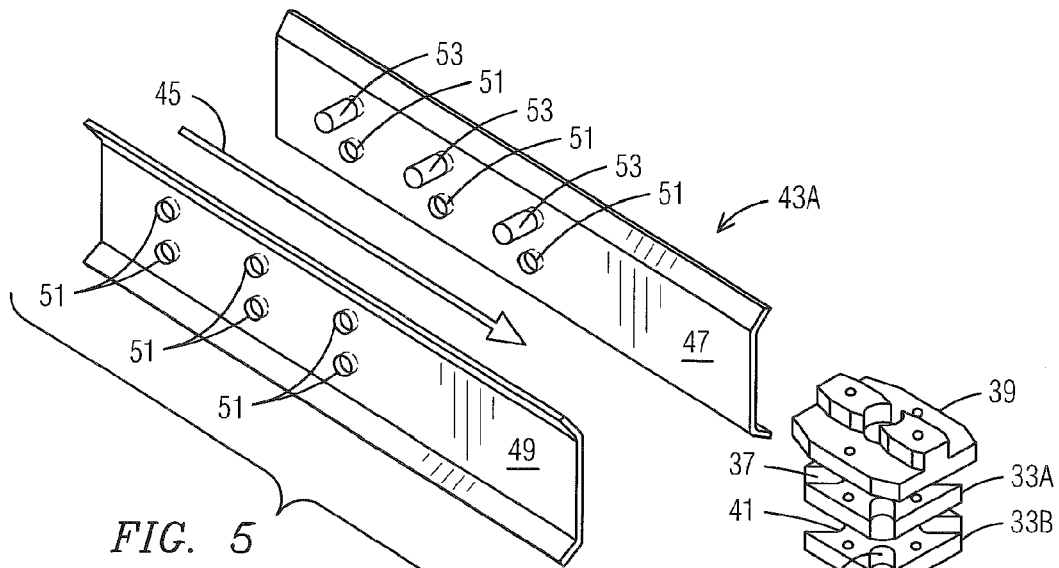
FIG. 5 shows a first arrangement of turning pins in relation to a first output position for the article support.

The purpose of the upper and lower cut-outs will now be described in reference to FIGS. 5 to 8. In FIGS. 5 to 8 several output positions are shown for the article support assembly 1, after having passed particular aligning, or turning stations 43A, 43B, 43C, 43D in a direction of conveyance indicated by arrow 45. The representation of FIGS. 5 to 8 is essentially schematic and structure that is not directly relevant to a correct understanding of the present disclosure, is omitted for clarity. Also the article support assembly 1 is shown in a simplified form with the turning block 33 separated in two levels of disks 33A, 33B to better visualise the upper and lower cut-outs 39, 41. Each of the turning stations 43A-43D has opposed left and right hand guiding walls 47, 49. Each left hand and right hand guiding wall 47, 49 has a series of openings 51 in a upper and a lower row, each consisting of three openings 51. Each opening 51 is adapted to selectively receive a turning pin 53. As shown in FIG. 5, three turning pins 53 are successively arranged in the upper row of openings 51 of the left hand guiding wall 47. Irrespective of the rotational position of the article support assembly 1 when it enters the turning station 43A, the three successive turning pins 53 in the upper row will always be sufficient to engage as many of the diagonal slots 37 as is necessary to bring the upper cut-out 39 (in level 33A of the turning block) in a position facing the left hand guide rail 47, once it has passed all three turning pins 53.

Figure 6:
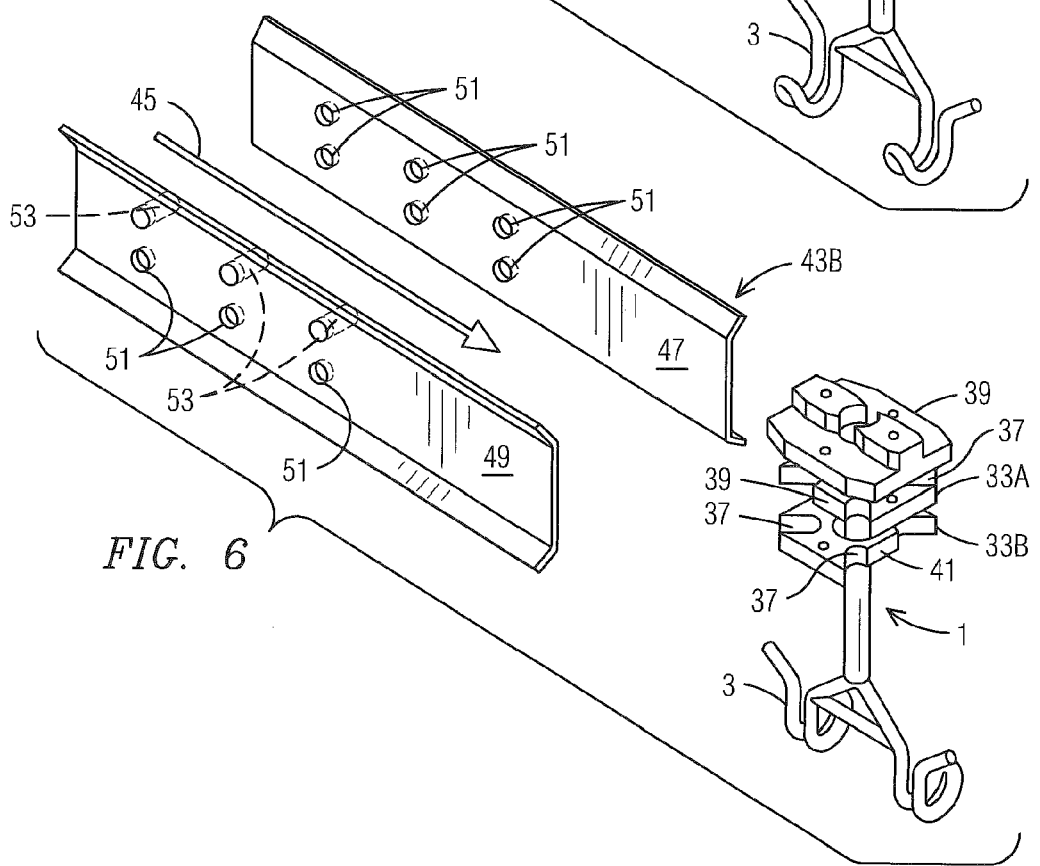
FIG. 6 shows a second arrangement of turning pins in relation to a second output position of the article support.
Figure 7:
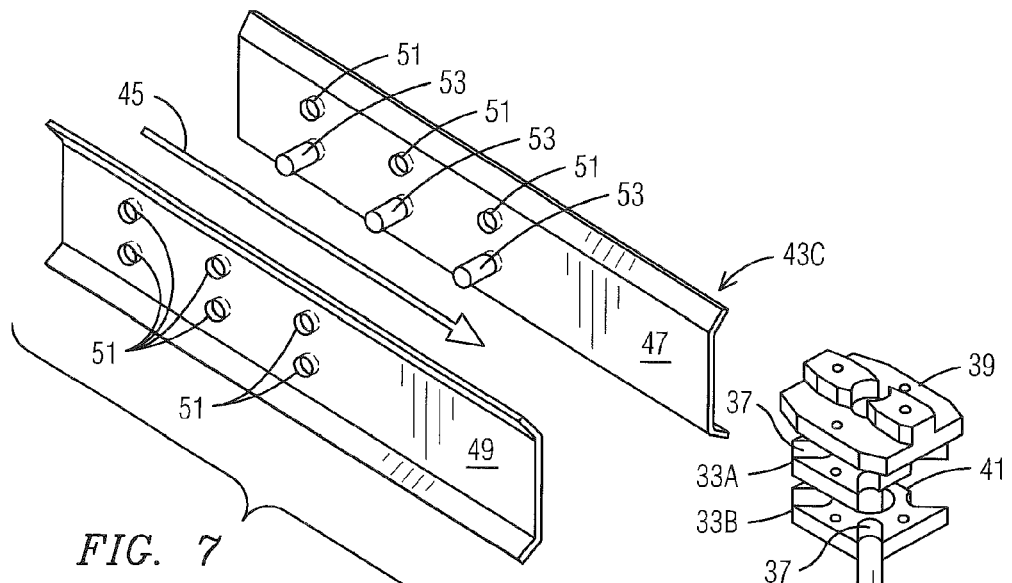
FIG. 7 shows a third arrangement of turning pins in relation to a third output position for the article support.

As shown in FIG. 6, three turning pins 53 are now mounted in the upper row of three opening 51 of the right hand guiding wall 49. This has the effect that article supported assembly 1 will now leave the turning station 43B with the upper cut-out 39 facing the right hand guiding wall 49. This results in a different position of the shackle 3 than that achieved with the turning station 43A of FIG. 5.

In FIG. 7 again a different arrangement of turning station 43C is shown. In this variation the three successive turning pins 53 are positioned in the lower row of opening 51 of the left hand guiding wall 47. The pins 53 now engage the diagonal slots 37 at the lower portion 33B of the turning block. Upon passage of the article support assembly 1 through the turning station 43C in the direction 45 of conveyance, the lower cut-out 41 will emerge from the turning station 43C, facing the left hand guide wall 47.

Figure 8:
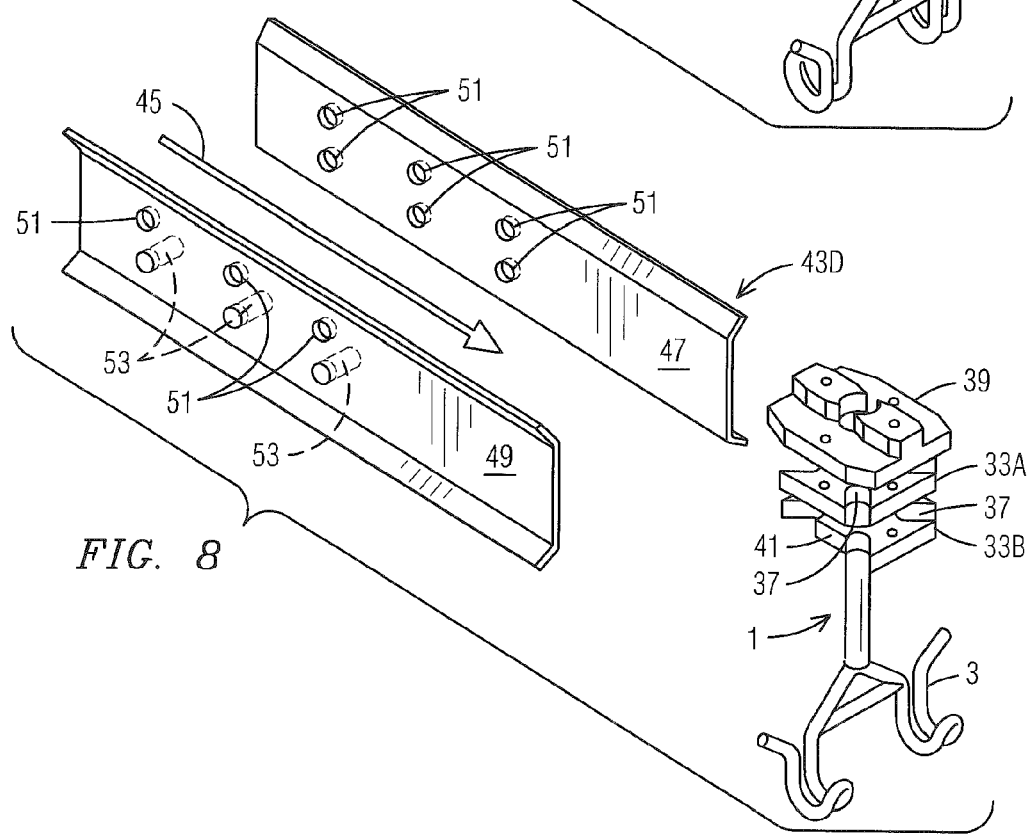
FIG. 8 shows a fourth arrangement of turning pins in relation to a fourth output position for the article support.

In a further variation according to FIG. 8, the turning station 43D has the successive turning pins 53 installed on the lower row of openings 51 in the right hand guide wall 49. This results in the lower cut-out 41 of the lower portion 33B of the turning block to emerge from the turning station 43D facing the right hand side wall 49. While one level of turning pins 53 that are 180° apart, using a second level for positioning the turning pins and a second cut-out at 90° from the first cut-out, enables positioning of the article support assembly 1 at predetermined position at 90°.

Accordingly an article support assembly 1 is disclosed that is adapted for movement by a conveyor along a path of conveyance. The article support assembly 1 includes a trolley 5 for engagement by the conveyor and a shackle 3 configured to support an article, and rotatable with respect to the trolley. A turning block 33 is associated with the shackle 3, and rotation of the turning block with respect to the trolley 5 causes corresponding rotation of the shackle relative to the trolley. Yieldable indexing means 23, 27, 29, 31 are operatively arranged between the trolley 5 and the turning block 33 to define at least a first and a second incremental rotational position for the shackle 3. The yieldable indexing means 23, 27, 29, 31 of the article support assembly 1 are biased into engagement by magnetic repelling forces. A conveyor system for conveying articles along processing stations is adapted to include the article support assembly 1 and comprises the turning stations 43A, 43B, 43C, 43D for giving a predetermined rotational position to the shackle 3 with respect to the trolley 5.

While it has been described in the above example that the indexing plunger 27 and the turning block 33 providing the yieldable indexing means are biased into engagement by magnetic repelling forces, it is alternatively also possible to obtain this bias by attracting magnetic forces. This effect can be obtained by positioning lower magnet in the indexing plunger 27, and accommodating upper magnets in suitable bores in the turning block 33, but with the confronting lower and upper magnets then positioned to have their opposite poles facing one another.

FIGS. 9 to 12 illustrate schematically several options of obtaining yieldable arresting means for indexing and latching predetermined relative positions between first and second relatively movable elements 61, 63. Each of the first and second elements 61, 63 is shown in partial cross section and it is to be understood that the first element 61 can be spaced from the second element 63 along an imaginary plane 65. In other words there need not be contact between the first and second elements 61, 63 when these are moved by relative translation or rotation in parallel to the imaginary plane 65.

Figure 9:
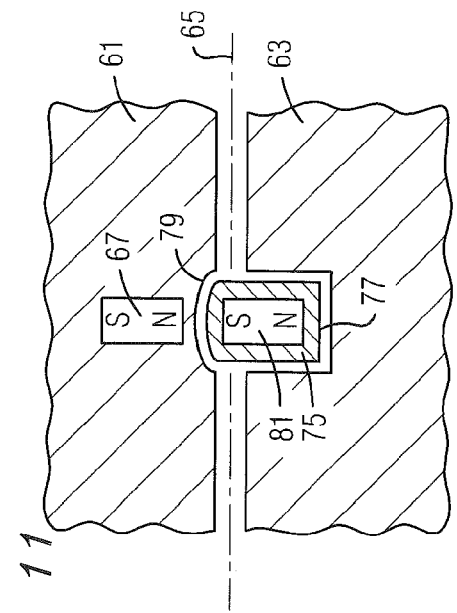
FIG. 9 schematically illustrates a first alternative embodiment of yieldable arresting means that can be used for indexing and latching.

In FIG. 9 there is also no contact between the yieldable arresting means formed by a first magnet 67 in the first element 61 and a second magnet 69 in the second element 63. The polarity of the first and second magnets 67, 69 is arranged such that their confronting poles attract one another. In FIG. 9 this is schematically indicated by "N" for north pole and "S" for south pole.

Figure 10:
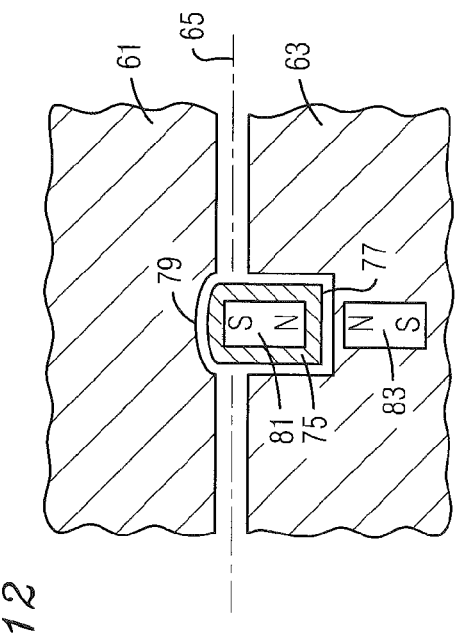
FIG. 10 schematically illustrates a second alternative embodiment of yieldable arresting means.

In the embodiment of FIG. 10 repelling forces are used to obtain a predetermined indexing position between the first and second elements 61, 63. To this end the embodiment of FIG. 10 uses a first upper magnet 67 and a pair of lower second magnets 71, 73. In this arrangement the polarities of the magnets are arranged such that these repel one another. In this way the upper magnet 67 will be arrested in a predetermined position in between the pair of lower magnets 71, 73. The arresting means of FIG. 10 may be more suitable for applications in which the velocity difference between the first and second elements 61, 63 is of such magnitude that arresting the movement with a single attracting magnet (such as in FIG. 9) may not function reliably.

Figure 11:
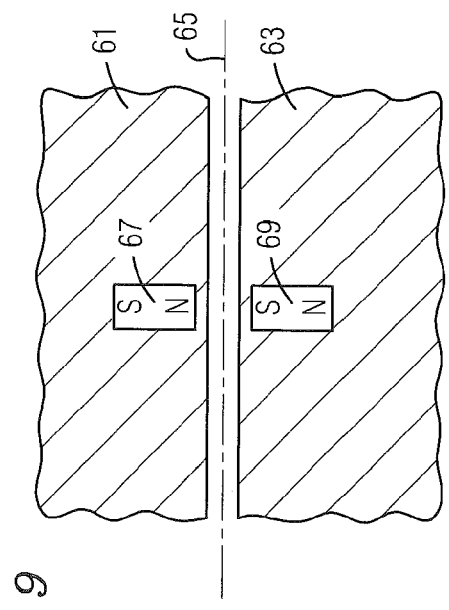
FIG. 11 schematically illustrates a third alternative embodiment of yieldable arresting means.

While the arresting means according to the embodiments of FIGS. 9 and 10 are completely contactless, there may also be situations where some friction is beneficial to control the movement taking place between the first and second elements 61, 63. Accordingly is it also possible to achieve magnetic arresting with mechanical contact between the first and second elements. FIG. 11 schematically illustrates one example that uses mechanical contact of a plunger element 75 that can telescope in and out from a mating cavity 77 in the second element 63. The first element 61 is provided with a recess 79, into which the plunger 75 can engage to arrest the first and second elements 61, 63 in a predetermined position. The plunger includes a plunger magnet 81, which is attracted by an upper magnet 67 in the first element 61. In this arrangement the plunger 75 is only urged toward the first element 61, when in the vicinity of the recess 79 which defines the indexing position. Friction will thus be limited to the direct area of engagement between the plunger 75 and the recess 79. The arrangement of FIG. 11 corresponds to the alternative that is mentioned above for the rotatable poultry meat hanger 1 of FIGS. 1 to 4.

Figure 12:
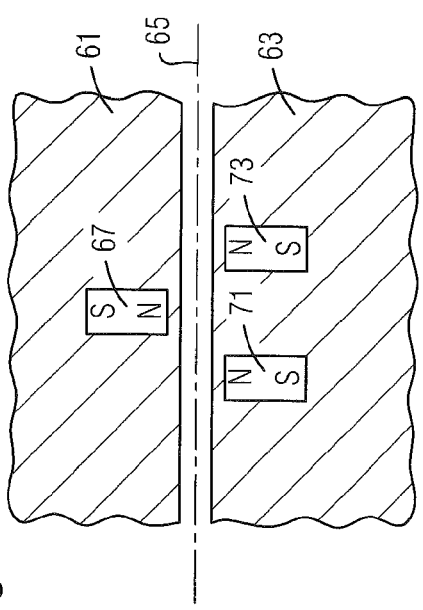
FIG. 12 schematically illustrates a fourth alternative embodiment of yieldable arresting means.

Another embodiment that uses mechanical contact between a plunger 75 and a first element 61 is shown in FIG. 12. The plunger 75 is again provided with a plunger magnet 81 and telescopable with respect to a mating cavity 77 as in the embodiment of FIG. 12. In contrast the first element 61 does not have a magnet but a further magnet 83 is now positioned below the cavity 77. The polarities of the uppermost plunger magnet 81 and the lowermost further magnet 83 are such that these are repelling one another. The repelling force between the magnets 81, 83 now urges the plunger 75 continually against the first element 61. This may result in a controlled amount of friction between the first and second elements 61, 63 that keeps the speed differences between the first and second elements 61, 63 under control, also when the plunger is not in the vicinity of the recess 79 in the first element 61. The arrangement of FIG. 12 corresponds to the yieldable indexing means 23, 27, 29, 31 of the hanger 1 of FIG. 1-4.

It should be noticed in respect to the various embodiments in accordance with FIGS. 9, 10, 11 and 12 that the magnets 67, 69, 71, 73, 81, 83 are encased in a non-magnetic material, such as plastic.

Encasing the magnets in the contactless arrangements of FIGS. 9 and 10 is particularly favourable for meat processing lines. As there is an issue with bacterial contamination, wherever the traditional indexing and arresting means create cavities, the arrangement of FIGS. 9 and 10 creates favourable circumstances to prevent bacterial contamination and to promote hygiene.

Figure 13:
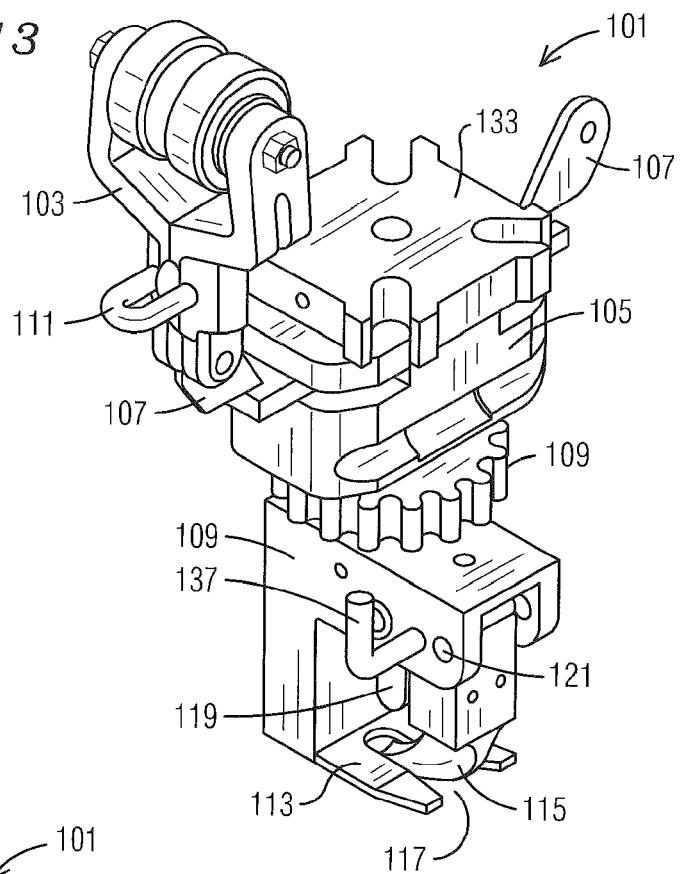
FIG. 13 shows a bone holder as a further use of magnetic arresting means in meat processing equipment.
Figure 14:
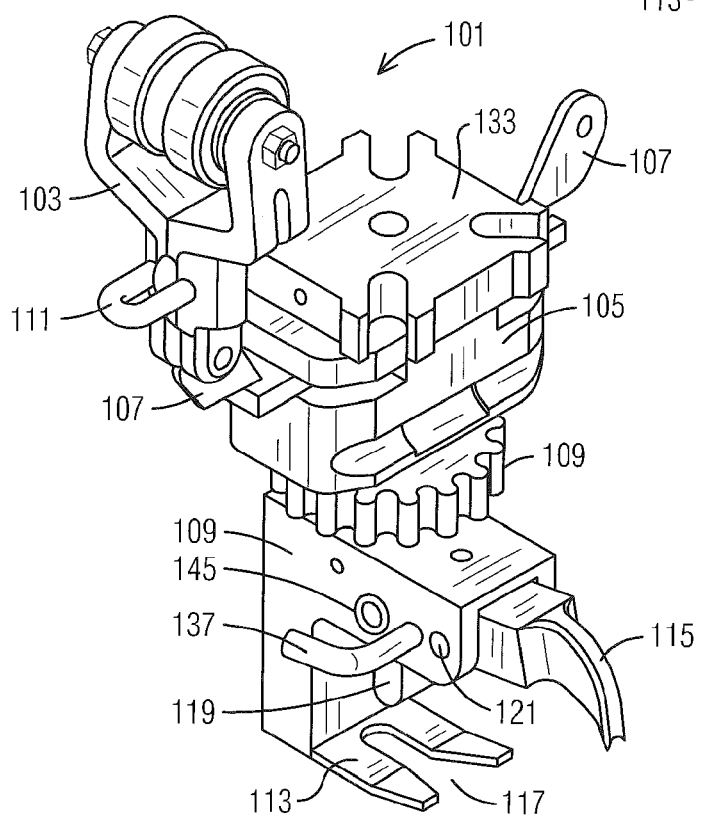
FIG. 14 shows the bone holder of FIG. 13, but with its locking arm in an open position.
Figure 15:
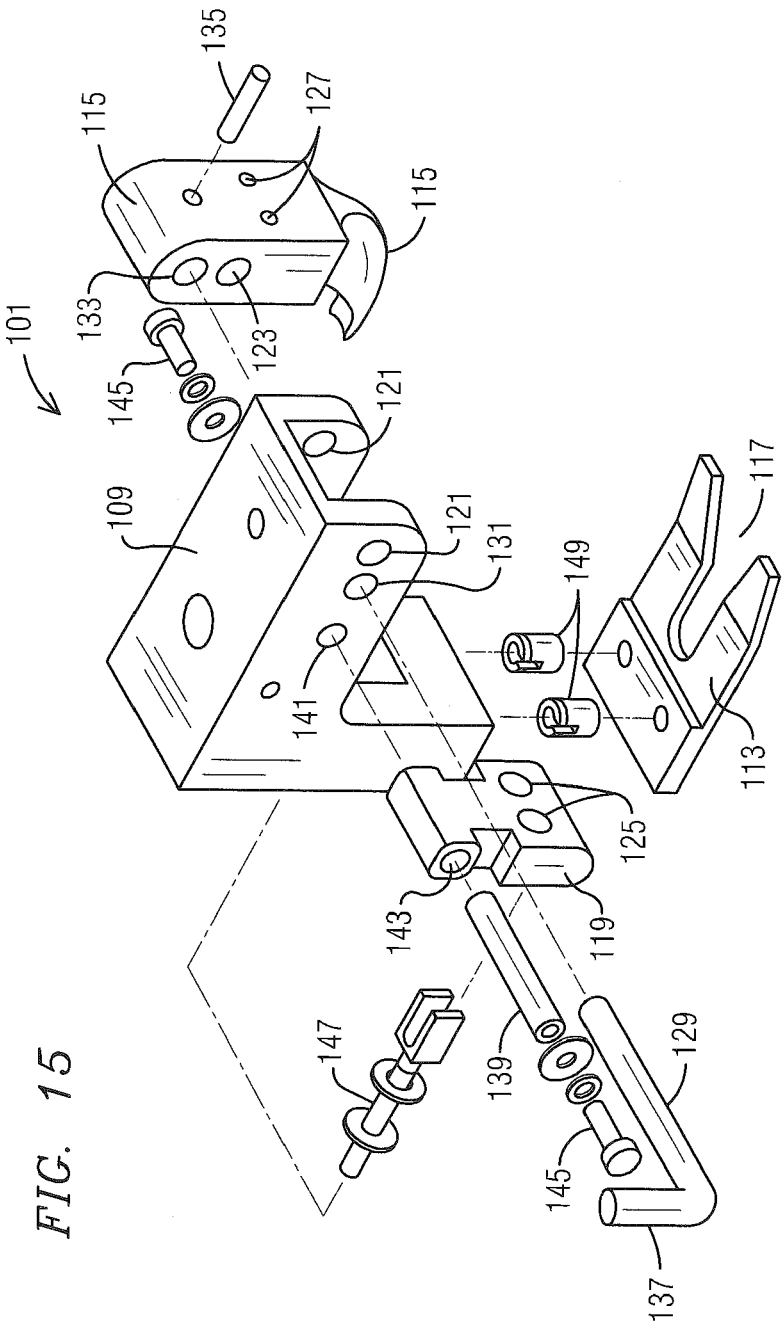
FIG. 15 is a perspective exploded view of the bone holder of FIGS. 13 and 14.

FIGS. 13 to 15 show yet another use of magnetic arresting means in meat processing equipment. Shown is a bone holder 101 that can be part of an overhead conveyor from which it is suspended by a trolley 103 connected to a trolley bracket, or shackle connector 107. Although for clarity only one trolley 103 is shown it should be understood that a similar trolley will be connected to the opposite trolley bracket 107. Both trolley brackets 107 are connected to a base block 105 that may be somewhat similar to the base block of the embodiment of FIGS. 1 to 4, including turning and indexing means for rotatably mounting a receiving block 109. The trolleys 103 will be connected to other trolleys by means of a chain 111, of which only a portion is shown. The receiving block of the bone holder 101 has a bifurcated receiving hook 113 at its lower end. A locking arm 115 is swivably mounted to the receiving block 109 to secure a bone knuckle engaged in the receiving slot 117. FIG. 14 shows the bone holder 101 with the swivable locking arm 115 in an open position, ready to receive an animal bone part. As can be seen in FIGS. 13 and 14 the locking arm 115 when closed is engaged against an abutment member 119 and in open position is arrested by magnets 121, of which only an outer one is visible. The arrangement, however, may correspond to either the FIG. 9 or FIG. 10 variant. It will further be seen in the exploded view of FIG. 15 that the receiving block 109 has mounted therein outer magnets 121 to confront inner magnets 123 on the swivable locking arm 115. The abutment member 119 has a first pair of latch magnets 125 mounted therein, while the locking arm 115 has a further second pair of latch magnets 127 mounted therein. The locking arm 115 is mounted for pivotal movement with respect to the receiving block 109 by means of a first pivot shaft 129 that is inserted through corresponding openings 131, 133 in the receiving block 109 and locking arm 115. The pivot shaft 129 is non-rotatably secured to the locking arm 115 by a transverse locking pin 135. Thus the locking arm 115 has only two stable positions, a first one when open and arrested by the outer and inner magnets 121, 123, and a second one when engaged against the abutment member 119 by a force generated by the attracting first and second pair of magnets 125, 127. As further seen in FIGS. 13 to 15 the first pivot shaft 129 on an exposed end is provided with an operating arm 137. The operating arm 137 is used to swivel the locking arm 115 from its open to its closed position and vice-versa. As bones to be held by the receiving block 109 of the bone holder 101 come in various sizes, the abutment member 119 is adjustably mounted about a second pivot shaft 139 that engages through aligned openings 141, 143 in the receiving block 109 and the abutment member 119. The second pivot shaft 139 is held in position by suitable screw fasteners 145 and optional further hardware, such as washers. For adjustment the abutment member 119 cooperates with a screw adjuster, generally indicated by reference numeral 147. Further it is shown that the bifurcated receiving hook 113 is detachably mounted by conventional fasteners 149, to be exchanged by differently sized units. This feature may further extend the range of animal bones that can be held by the device. It is also of advantage that the attracting force of the confronting pairs of latching magnets 125, 127 will also accommodate slight variation in size of bones, which may still occur, in spite of a particular adjustment made to the abutment member 119.

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

What is claimed is:

1. Meat processing equipment for conveying a piece of meat along a processing path and allowing selective reorientation of the piece of meat as it moves along the processing path, the meat processing equipment comprising:
   a first element having a first face;
   a support configured to receive and support a piece of meat, the support being selectively orientable with respect to the first element;
   a second element having a second face and being mounted to the support such that orientation of the second element relative to the first element causes corresponding orientation of the support relative to the first element;
   a plunger slidably held in a cavity extending through the face of one of the first element and the second element, the plunger being movable within the cavity between a first position projecting out of the cavity and a second position retracted into the cavity relative to the first position;
   an indexing feature formed in the other one of the first and second elements and being positioned for engagement by the plunger when the plunger is moved to the first position;
   the plunger and the indexing feature, when engaged, defining yieldable arresting means for yieldably arresting the second element and the support in at least one predetermined orientation relative to the first element;
   at least first and second permanent magnets associated with at least one of the first and second elements and the plunger, the first and second permanent magnets being arranged to urge the plunger yieldably to its first position engaging the indexing feature; and
   a turning station positioned and configured to interact with the second element as the meat is conveyed along the processing path so as to orient the second element and thereby the support and the piece of meat in the at least one predetermined orientation.

2. Meat processing equipment according to claim 1, wherein the first and second magnets are attracting one another.

3. Meat processing equipment according to claim 1, wherein the at least first and second magnets are repelling one another.

4. Meat processing equipment according to claim 1 wherein the first element includes a cavity for accommodating the first magnet.

5. Meat processing equipment according claim 1 wherein the second element includes a cavity for accommodating the first magnet.

6. Meat processing equipment according to claim 1 wherein the second element includes a further cavity that accommodates a third permanent magnet forming a pair with the second magnet.

7. Meat processing equipment according to claim 1, wherein both the first and second magnets are associated with the second element, on one side of the common plane.

8. Meat processing equipment according to claim 1 wherein the yieldable arresting means is incorporated in a support assembly for parts of slaughtered animals.

9. Meat processing equipment according to claim 1 wherein the support assembly is a hanger for poultry.

10. Meat processing equipment according to claim 9, wherein the hanger for poultry is arranged for attachment to a conveyor extending along a processing path, the poultry hanger further comprising:
    a trolley securable to the conveyor;
    the support comprising a shackle rotatably secured with respect to the trolley and configured to support an article; and
    the yieldable arresting means being embodied as an indexing arrangement associated with the shackle and configured to maintain the shackle yieldably in at least a first and a second indexed rotational orientation relative to the processing path;
    the indexing arrangement comprising confronting surfaces rotatable with respect to each other and having surface features that mate when the shackle is in the first and the second indexed rotational orientations; and
    the first and second permanent magnets being positioned and oriented to urge the confronting surfaces toward one another through magnetic force when the shackle is in the first and the second indexed rotational orientations.

11. Meat processing equipment according to claim 10, further comprising a turning block associated with the shackle, rotation of the turning block relative to the trolley causing corresponding rotation of the shackle relative to the trolley.

12. Meat processing equipment according to claim 11, wherein the indexing arrangement is disposed between the turning block and the trolley.

13. Meat processing equipment according to claim 8, wherein the support assembly is a bone holder.

14. Meat processing equipment according to claim 13, wherein the bone holder is rotatably suspended from an overhead conveyor.

15. Meat processing equipment according to claim 13 wherein the bone holder includes a receiving block and a locking arm that is swivelable with respect to the receiving block between an open and a closed position and is embodied as one of the first and second elements and wherein the receiving block is embodied as the other of the first and second elements.

16. Meat processing equipment according to claim 15, wherein the swivelable locking arm is magnetically latched in its closed position.

17. Meat processing equipment according to claim 15 wherein the swivelable locking arm is magnetically arrested in its open position.

* * * * *